United States Patent Office 3,475,494
Patented Oct. 28, 1969

3,475,494
SULFONE ALDEHYDES
Kent C. Brannock, Kingsport, Tenn., assignor to Eastman Kodak Company, Rochester, N.Y., a corporation of New Jersey
No Drawing. Filed June 22, 1964, Ser. No. 377,054
Int. Cl. C07c *147/02;* C10m *1/38;* C08f *45/46*
U.S. Cl. 260—601
9 Claims

ABSTRACT OF THE DISCLOSURE 2,2-dialkyl-4-sulfone aldehydes and dialdehydes and alcohols and glycols derived therefrom. The alcohols and glycols are used in the manufacture of synthetic ester lubricants and plasticizers. The 2,2-dialkyl-4-sulfone aldehydes and dialdehydes are manufactured by reacting an alkyl vinyl sulfone with an n-alkyl aldimine and hydrolyzing the resulting product or by quaternizing a 2-alkylsulfonyl (cyclobutylamine) or 2,2'-sulfonylbis-(cyclobutylamine) and hydrolyzing the resulting quaternary.

---

This invention relates to novel organic compounds and to their method of preparation and more particularly to novel sulfone aldehydes and their preparation.

The compounds of the invention comprise novel 2,2-dialkyl sulfone aldehydes of the formulae:

(I) 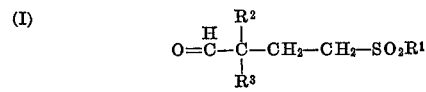

and (II) 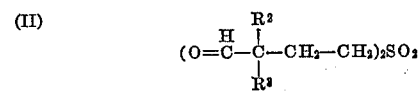

In these formulae $R^1$, $R^2$ and $R^3$ can be the same or different lower alkyl radicals, straight or branched chain, e.g., of 1 to 4 carbon atoms, such as methyl, ethyl, propyl, butyl and isobutyl. In addition $R^1$ can be phenyl and $R^2$ and $R^3$, taken together, can be joined alkylene groups that, taken together with the carbon to which they are attached, represent a cyclopentane or cyclohexane ring. The expression "2,2-dialkyl" is thus used broadly herein to include both the monovalent lower alkyls and the equivalent joined alkylene groups. The 2,2-dialkyl substituents of the products are significant in providing derivatives, e.g., esters, having good stability.

The method of the invention by means of which the novel compounds can be prepared has two modifications. In the preferred method an aldimine, derived from a primary amine and an aldehyde having a single α-hydrogen, is added to an α,β-unsaturated sulfone. The resulting sulfone aldimine is thereafter hydrolyzed to the sulfone aldehyde.

The method of preparation can be illustrated by the following equations:

(1) 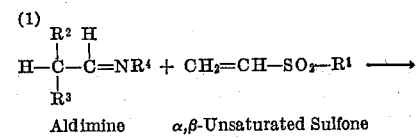

Aldimine     α,β-Unsaturated Sulfone

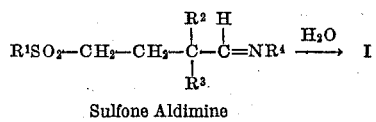

Sulfone Aldimine (2) 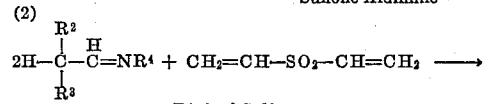

Divinyl Sulfone

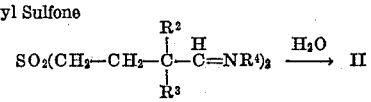

$R^4$ originates with the primary amine, $R^4NH_2$, which is used to prepare the aldimine. Since $R^4$ has little effect on the reaction, and is not present in the final products, it can be essentially any inert organic radical and its choice is based on the availability and ease of recovery of the primary amine, $R^4NH_3$. It can, for example, be virtually any alkyl or aralkyl group, primary, secondary or tertiary, having up to about 18 carbon atoms. Examples include methyl, ethyl, propyl, isopropyl, sec-butyl, tert-butyl, n-butyl, isobutyl, 2-ethylhexyl, dodecyl, octadecyl, benzyl, 3-phenylpropyl, 2-(p-tolyl)ethyl, 2,2-diphenylbutyl, etc. Preferably $R^4$ is an alkyl of up to about 8 carbon atoms.

Suitable aldimines for the reaction of Equation 1 include: N-methylisobutylideneamine, N-ethylisobutylideneamine, N-n-propylisobutylideneamine, N-n-butylisobutylideneamine, N-benzylisobutylideneamine, N-ethyl-2-ethylhexylideneamine, N-isobutyl - 2 - ethylbutylideneamine, N-propyl-2-ethylhexylideneamine N-propyl - 2-ethyl-4-methylpentylideneamine, and the like. These aldimines can be prepared by the general method described by R. Tiollais, Bull. soc. Chim. France, pages 708–724 (1947) CA 42, 8156 (1948), wherein the appropriate aldehyde having a single α-hydrogen and the amine are reacted at 0° C. in approximately equimolar proportions, and the aldimine product is recovered by drying the organic layer and distilling.

Suitable α,β-unsaturated sulfones for reaction with the aldimines include divinylsulfone and various sulfones of the formula, $R^1SO_2CH=CH_2$, such as: methylvinylsulfone, ethylvinylsulfone, n-propyvinylsulfone, n-butylvinylsulfone, isobutylvinylsulfone and phenylvinylsulfone.

Temperatures employed for the process of the invention depend on the specific reactants employed. In general, the temperatures range from about 20 to 200° C. Pressures from below to above atmospheric can be used but atmospheric pressure is preferred. Reaction times vary with reactants and temperature but the reactions are usually rapid and are substantially complete in from ½ hour to 3 hours. A solvent is not normally required but, if desired, the reactions can be carried out in an inert solvent such as a hydrocarbon, e.g., toluene, xylene, or the like. No catalysts are required for reaction of the aldimine with the unsaturated sulfone. In the hydrolysis stage, mineral acids such as hydrochloric, sulfuric and phosphoric can be used, as well as organic acids such as acetic, benzoic, oxalic and the like. Since the yields in these reactions are excellent it is usually best to use stoichiometric amounts of reactants. For the reactions of the phenyl and alkylvinylsulfone either the sulfone or the aldimine can be used in excess if desired. In the divinyl sulfone reactions it is desirable to use at least 2 moles of the aldimine per mole of sulfone and it is preferred to use more than 2 moles in order to avoid the formation of any vinylsulfonyl aldehyde which might result from incomplete reaction.

The sulfone aldehydes and dialdehydes produced in accordance with the invention are useful as chemical intermediates. For example, they can be reduced to the corresponding alcohols and diols, e.g., by catalytic hydrogenation or by chemical reduction with an alkali metal borohydride. The alcohols and diols can then be esterified with various mono- or dicarboxylic acids, e.g., acetic, isobutyric, heptanoic, 2-ethylhexanoic, adipic, azelaic, and sebacic, to produce liquid esters, diesters or polyesters useful as synthetic lubricants or as primary or secondary plasticizers for resins such as poly(vinyl chloride) and cellulose esters. Preparations of such esters and their uses as plasticizers are illustrated by the patent to Garner et al., U.S. 2,812,267.

The examples which follow illustrate the method and novel products of the invention and the utility of products of the invention. The first example demonstrates the preparation of a sulfone aldehyde by reaction of an alkyl vinylsulfone with an N-alkyl aldimine.

EXAMPLE 1

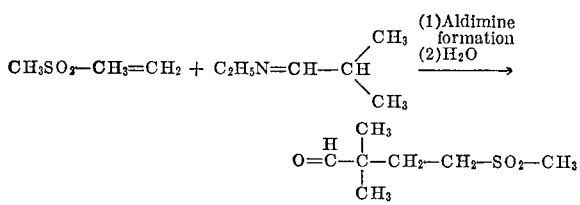

Methyl vinyl sulfone (15.9 g., 0.15 mole) and N-ethyl isobutylidene amine (16 g., 0.16 mole) were combined and heated under reflux for 1 hour while the temperature rose from 93 to 150° C. It was then held at 150–160° for 30 minutes. The reaction mixture, consisting for the most part of ethylamine Schiff's base of 2,2-dimethyl-4-(methyl sulfonyl)butyraldehyde was treated with dilute hydrochloric acid for 18 hours at room temperature. The organic phase was taken up in chloroform and distilled to give 19.7 g. (74%) of 2,2-dimethyl-4(methyl sulfonyl)butyraldehyde, B.P. 126–129° at 0.5 mm., $n_D^{20}$ 1.4710.

*Analysis.*—Calcd. for $C_7H_{14}SO_3$: C, 47.2; H, 7.9. Found: C, 47.6; H, 8.1.

The 2,4-dinitrophenylhydrazone melted at 153–154°.

The next example demonstrates the preparation of a sulfone dialdehyde by the reaction of divinylsulfone with an N-alkyl aldimine in a 1:2 molar ratio.

EXAMPLE 2

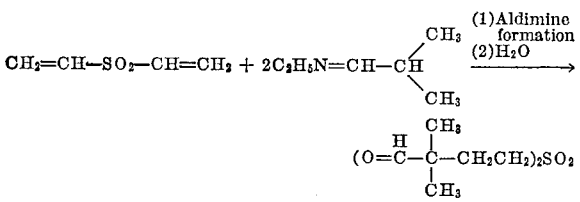

Divinyl sulfone (59 g., 0.5 mole) and N-ethyl isobutylideneamine (109 g., 1.1 mole) were combined at room temperature. An exothermic reaction took place with the temperature rising to 63° after 20 minutes. After the exothermic reaction had subsided the mixture was heated to 150°, cooled to room temperature and hydrolyzed with dilute hydrochloric acid. The solid 4,4'-sulfonyl-bis(2,2-dimethylbutyraldehyde) was removed by filtration, and the crude product represented an 88.5% yield. The material was recrystallized from ethanol and had a melting point of 103–106°.

*Analysis.*—Calcd. for $C_{12}H_{22}SO_4$: C, 54.94; H, 8.45. Found: C, 55.2; H, 8.42.

The bis(2,4-dinitrophenylhydrazone) melted at 237–9° and contained 18.0% nitrogen which is also the calculated value for $C_{24}H_{30}N_8SO_{10}$.

EXAMPLE 3

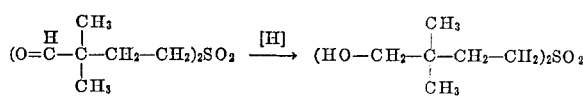

Reduction of the dialdehyde of Example 2 with sodium borohydride gave 4,4'-sulfonylbis(2,2-dimethylbutanol), M.P. 89–92°.

EXAMPLE 4

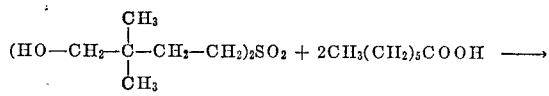

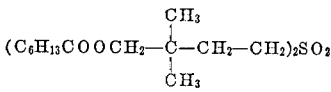

Esterification of 4,4' - sulfonylbis(2,2-dimethylbutanol) with heptanoic acid by heating the reactants under reflux in an approximately 1:2 molar ratio, using xylene and a water trap for removing the water of reaction, gave 4,4'-sulfonylbis(2,2-dimethylbutyl heptanoate), boiling range (molecular distillation) 128–161° at 2.5μ, $n_D^{20}$ 1.4675. This ester had a viscosity of 163 cs. at 100° F. and 12 cs. at 210° F. Its evaporation rate at 400° F., determined according to MIL–L–7808C specification for synthetic lubricants, is 2.8%. These properties make the ester useful as a thickener for less viscous synthetic ester lubricants and as a lubricant itself when high viscosity and low volatility are needed.

The next example illustrates another dialdehyde preparation in accordance with the invention and indicates a valuable property of the novel dialdehydes, namely, their storage stability.

EXAMPLE 5

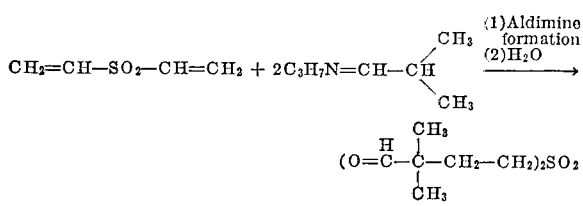

N-propylisobutylideneamine, 208 g. (1.85 mole) was heated to 100° and divinylsulfone, 105 g. (0.89 mole) was added at a rate such as to maintain the temperature at 100–110°. After completion of the addition the temperature was raised to 150° by heating. The mixture was then cooled and hydrolyzed with dilute hydrochloric acid. The solid product was filtered, washed with water and then ether to give 237 g. of 4,4'-sulfonylbis(2,2-dimethylbutyraldehyde), a 100% yield. This aldehyde, in contrast to most dialdehydes which resinify on standing, is quite stable and can be stored indefinitely when inhibited against oxidation by an antioxidant such as hydroquinone or tert-butyl catechol.

The next examples illustrate further preparations of aldehydes and the corresponding alcohols in accordance with the invention.

EXAMPLE 6

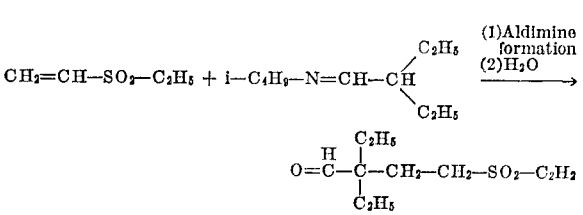

Ethyl vinyl sulfone and N-isobutyl-2-ethylbutylideneamine were combined in an equimolar ratio and heated for 1 hour while the temperature rose from 130° to 170°. The reaction mixture was cooled and hydrolyzed with dilute sulfuric acid at room temperature for 8 hours. Distillation of the organic phase gave 2,2-diethyl-4-(ethylsulfonyl)butyraldehyde, B.P. 140–146° at 0.2 mm., $n_D^{20}$ 1.4903, in 64% yield. Reduction of the aldehyde with sodium borohydride gave 2,2-diethyl-4(ethylsulfonyl)butanol, B.P. 148–153° at 0.2 mm.

EXAMPLE 7

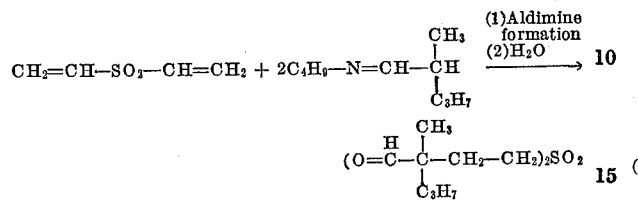

In a manner similar to that described in Example 2 divinyl sulfone and N-butyl 2-methylpentylidene amine gave a 90% yield of 4,4'-sulfonylbis(2-methyl-2-propylbutyraldehyde) as an oil which was not purified but was used directly for conversion to the corresponding diol, 4,4'-sulfonylbis(2-methyl-2-propyl-butanol), by reduction with sodium borohydride. The diol was obtained as a waxy solid, M.P. 28–32°.

EXAMPLE 8

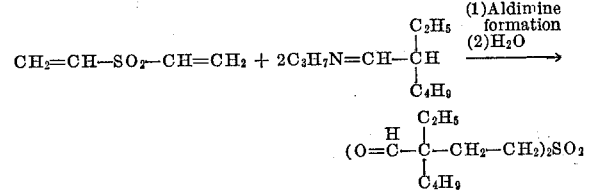

In a like manner divinyl sulfone and N-propyl-2-ethylhexylideneamine gave 4,4' - sulfonylbis(2 - ethyl-2 - butylbutyraldehyde) as an oil which was reduced to the diol, 4,4'-sulfonylbis(2-ethyl-2-butylbutanol). The diol in this case is a liquid and is obtained in a satisfactory state of purity for use in the preparation of esters directly.

EXAMPLE 9

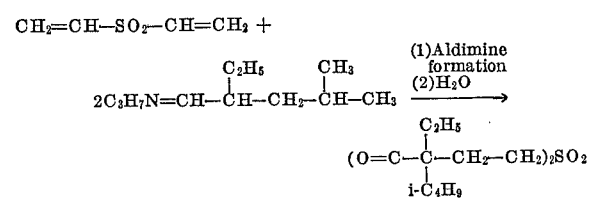

In a like manner divinylsulfone and N-propyl-2-ethyl-4-methylpentylideneamine gave 4,4'-sulfonylbis(2-ethyl-2 - isobutylbutyraldehyde, an oil, and in turn the corresponding diol, 4,4'-sulfonylbis(2-ethyl-2-isobutylbutanol), also an oil, was obtained by reduction of the dialdehyde.

The other method of synthesizing sulfone aldehydes and dialdehydes in accordance with the invention, in general, comprises treating with a quaternizing agent a 2-alkylsulfonyl (cyclobutylamine) or a 2,2'-sulfonylbis (cyclobutylamine) and thereafter hydrolyzing the quaternary ammonium compound with an aqueous alkaline solution to obtain the desired sulfone aldehyde or dialdehyde.

The reaction conditions in this second method of preparation are of the same order as those of the preferred method. Suitable quaternizing agents include methyl p-toluenesulfonate, methyl iodide, methyl bromide, diethyl sulfate, triethyl phosphate and the like. The hydrolysis can be carried out simply by heating the quaternary salt in an aqueous alkaline solution such as ammonium hydroxide, potassium hydroxide, sodium hydroxide, sodium carbonate or the like. The second method of preparation can be represented by the following reactions, (3) and (4), using methyl p-toluenesulfonate to illustrate the quaternizing agent:

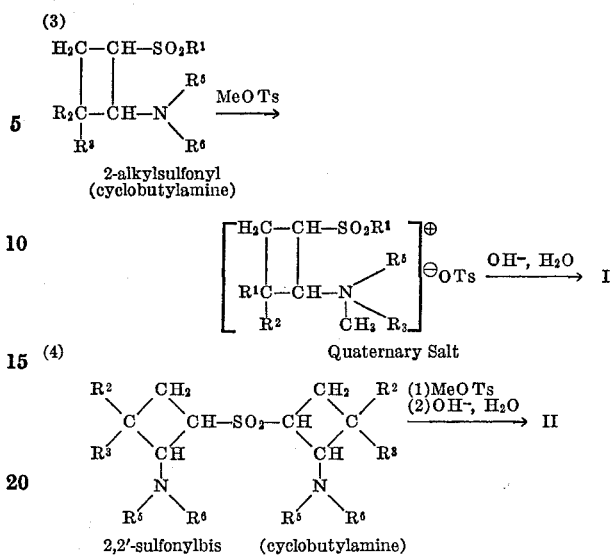

The symbols $R^1$, $R^2$, and $R^3$ have the same meanings as previously given. $R^5$ and $R^6$, taken singly, represent the same or different monovalent radicals of the same types as $R^4$. Taken collectively with the nitrogen atom, $R^5$ and $R^6$ represent a heterocyclic group such as, piperidino, pyrrolidinyl; morpholino, thiamorpholino and such groups having lower alkyl substituents on at least one of their carbon atoms. The 2-alkylsulfonyl(cyclobutylamine) starting materials for reaction (3) and the 2,2'-sulfonylbis(cyclobutylamine) starting materials for reaction (4) can be prepared as disclosed by Brannock et al., J. Org. Chem. 29, 801 (1964), by the cycloaddition of a vinyl sulfone with 2 moles of an enamine obtained by the reaction of a secondary amine with an aldehyde having a single α-hydrogen atom. Examples of such enamines include N,N - dimethylisobutenylamine, N,N - diethyl-2-ethyl-1-hexenylamine, 1-isobutenylpiperidine, N-(2-ethyl-1-butenyl) piperidine, N-isobutenylmorpholine, 1-cyclohexylidenemethylpiperidine, etc.

The second method of preparation is illustrated by the following examples:

EXAMPLE 10

N,N - 2,2 - tetramethyl - 4 - (methylsulfonyl)cyclobutylamine, (23 g., 0.11 mole) was treated with methyl p-toluene sulfonate (23 g., 0.12 mole) and heated on a steam bath for 2.5 hours. The resulting quaternary salt was treated with 10 g. of potassium hydroxide in 60 ml. of water and heated on a steam bath for 1 hour. The organic material was extracted with chloroform and distilled to give 5.5 g. of 2,2-dimethyl-4-(methyl sulfonyl) butyraldehyde containing as an impurity a small amount of 2,2-dimethyl-4-(methyl sulfonyl) cyclobutanol.

EXAMPLE 11

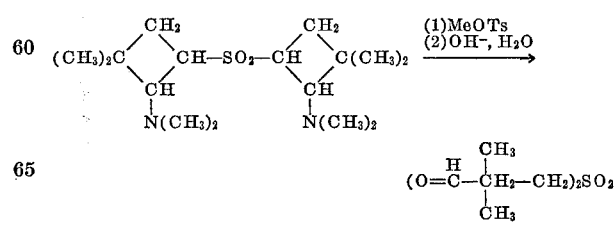

In a similar manner, 4,4' - sulfonyl-bis(2,2 - dimethyl butyraldehyde) was obtained from 2,2'-sulfonyl bis(N, N,4,4-tetramethyl cyclobutylamine). The latter compound was obtained from divinyl sulfone and N,N-dimethylisobutenylamine by the method described in J. Org. Chem. 29, 801 (1964).

From the above description it can be seen that I have developed simple and convenient procedures for producing in good yield and reasonable purity certain 2,2-dialkyl-4-sulfonylbutyraldehydes and corresponding novel alcohols. These products are particularly useful as intermediates for esters that have good thermal and hydrolytic stability, apparently because of the 2,2-dialkyl substituents which provide steric hindrance or otherwise protect the ester linkages from attack.

Although the invention has been described in considerable detail with particular reference to certain preferred embodiments thereof, it will be understood that variations and modifications can be effected within the spirit and scope of the invention as described hereinabove, and as defined in the appended claims.

I claim:
1. Aldehydes of the formulae

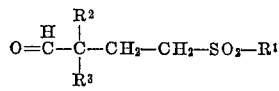

and

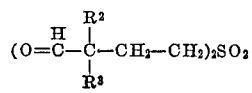

wherein $R^1$, $R^2$ and $R^3$ are lower alkyl.
2. 2,2-dimethyl-4(methylsulfonyl)butyraldehyde.
3. 4,4'-sulfonyl-bis(2,2-dimethylbutyraldehyde).
4. 2,2-diethyl-4-(ethylsulfonyl)butyraldehyde.
5. 4,4'-sulfonylbis(2-methyl-2-propylbutyraldehyde).
6. 4,4'-sulfonylbis(2-ethyl-2-butylbutyraldehyde).
7. 4,4'-sulfonylbis(2-ethyl-2-isobutylbutyraldehyde).
8. The method of preparing a 2,2-dialkyl sulfone aldehyde of the formula

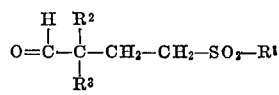

which comprises, at a temperature of about 20° C. to about 200° C., adding a vinyl sulfone of the formula, $CH_2=CH-SO_2-R^1$, to an aldimine of the formula,

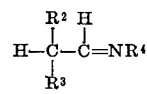

and subjecting to hydrolysis the resulting sulfone aldimine; wherein $R^1$, $R^2$, $R^3$ and $R^4$ are lower alkyl singly, are lower alkyl; and $R^4$ is selected from the group consisting of alkyl and aralkyl of up to about 18 carbon atoms.

9. The method of preparing a 2,2-dialkyl sulfone aldehyde of the formula

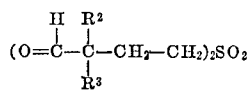

which comprises, at a temperature of about 20° C. to about 200° C., adding divinylsulfone to an aldimine of the formula,

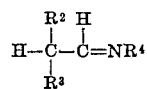

and subjecting to hydrolysis the resulting sulfone aldimine; wherein $R^1$, $R^2$ and $R^3$ are lower alkyl; and $R^4$ is selected from the group consisting of alkyl and aralkyl of up to about 18 carbon atoms.

References Cited

Beilsteins Handbuch Der. Org. Chemie, Band 1, Dritter Teil, page 3239, System Number 71–151.

LEON ZITVER, Primary Examiner

R. H. LILES, Assistant Examiner

U.S. Cl. X.R.

252—56; 260—31.2, 31.8, 485, 488, 598, 599, 607